United States Patent [19]

Liddiard

[11] Patent Number: 5,369,280
[45] Date of Patent: Nov. 29, 1994

[54] SEMICONDUCTOR FILM BOLOMETER THERMAL INFRARED DETECTOR

[75] Inventor: Kevin C. Liddiard, Adelaide, Australia

[73] Assignee: The Commonwealth of Australia, Canberra, Australia

[21] Appl. No.: 940,883

[22] PCT Filed: Apr. 24, 1991

[86] PCT No.: PCT/AU91/00162

§ 371 Date: Dec. 17, 1992

§ 102(e) Date: Dec. 17, 1992

[87] PCT Pub. No.: WO91/16607

PCT Pub. Date: Oct. 31, 1991

[30] Foreign Application Priority Data

Apr. 26, 1990 [AU] Australia ............... PJ9813

[51] Int. Cl.⁵ ................................. G01J 5/20
[52] U.S. Cl. ................. 250/370.08; 250/332; 250/338.4; 257/467; 374/121
[58] Field of Search ............. 250/338.4, 338.3, 370.08, 250/330, 332; 257/467, 470; 374/121

[56] References Cited

U.S. PATENT DOCUMENTS

| | | | |
|---|---|---|---|
| 3,069,644 | 12/1962 | Eberhardt . | |
| 3,675,018 | 7/1972 | Paul . | |
| 4,110,616 | 8/1978 | Porter et al. . | |
| 4,116,063 | 9/1978 | LeBlanc et al. . | |
| 5,021,663 | 6/1991 | Hornbeck | 250/349 |
| 5,118,944 | 6/1992 | Mori et al. | 250/349 |
| 5,293,041 | 3/1994 | Kruse, Jr. | 250/338.3 |

FOREIGN PATENT DOCUMENTS

| | | | |
|---|---|---|---|
| 248710 | 5/1963 | Australia . | |
| 59-90024 | 5/1984 | Japan | 250/338.3 |
| 194227 | 4/1989 | Japan | 250/338.3 |
| 46424 | 1/1992 | Japan | 374/121 |
| 8201066 | 4/1982 | WIPO . | |

OTHER PUBLICATIONS

Racine et al, "Low-Temperature Operating Silicon Bolometers for Nuclear Radiation Detection." Sensors and Actuators A21–A23 (1990) pp. 478–481.

Parsons et al., "Thin-film infrared absorber structures for advanced therman detectors", J. Vac. Sci. Technol. A, vol. 6, No. 3, May/Jun. 1988, pp. 1686–1689.

Silberg, Paul A., "Infrared Absorption of Three-Layer Films", Journal of the Optical Society of America, vol. 47, No. 7, Jul. 1957, pp. 575–578.

Liddiard, K. C., "Thin-Film Resistance Bolometer IR Detectors", Infrared Phys., vol. 24, No. 1, 1984, pp. 57–64.

Liddiard, K. C., "Thin-film Resistance Bolometer IR Detectors-II", Infrared Phys., vol. 26, No. 1, 1986, pp. 43–49.

Primary Examiner—Paul M. Dzierzynski
Assistant Examiner—Drew A. Dunn
Attorney, Agent, or Firm—Cushman, Darby & Cushman

[57] ABSTRACT

A thermal infrared detector comprising a dielectric pellicle suspended over a cavity in a substrate, the pellicle supporting a detector element comprising a heat sensitive semiconductor layer between a pair of thin fim metallic contracts, these being deposited on the pellicle, the cavity being formed by etching and removal of the substrate material through holes or slots in the surface of the substrate.

16 Claims, 5 Drawing Sheets

# SEMICONDUCTOR FILM BOLOMETER THERMAL INFRARED DETECTOR

This patent relates to a method of preparation of a semiconductor film bolometer thermal infrared detector and to the detector construction described herein.

BACKGROUND OF THE INVENTION

The invention refers to a thermal infrared detector of the resistance bolometer type, whereby radiation incident on the detector is absorbed, causing a rise in the temperature of the detector and a change in electrical resistance. This resistance change is observable as a variation in the electrical bias current or voltage applied to the detector.

It must be understood that thin film resistance bolometer infrared detectors have been previously described. Reference may be made to a paper by K. C. Liddiard entitled "Thin Film Resistance Bolometer IR Detectors" published in Infrared Physics, Vol. 24, No. 1, p. 57, January 1984, and other references cited therein. Patents on bolometer detectors are also well known, for example the patents to K. C. Liddiard, Australia No. 537314; U.S. Pat. No. 4,574,263; Canada No. 1184642; Europe No. 0060854. Those patents also cite a number of references on the art.

However, the papers and patents cited refer to metal film bolometer detectors, wherein the heat sensitive material is a thin metal film. These detectors have a tow temperature coefficient of resistance (TCR) and low electrical resistance, which together give very small signal levels in the nanovolt range. Consequently, the infrared responsivity measured as the ratio of signal voltage to incident radiant power is also small, typically less than 100 volts per watt. It is the objective of the present invention to improve the detecting ability by employing a semiconductor film as the heat sensitive material. Both the TCR and electrical resistance are much larger, resulting in signal levels in the microvolt range, with responsivities exceeding 10000 volts per watt. Such high signal levels, together with a smaller power dissipation, make the semiconductor bolometer more suitable for large focal plane arrays.

U.S. Pat. No. 4,116,063 describes a bolometer designed specifically to operate at a very low temperature, and has a sensitive element of a semiconductor crystal extended on two faces by beams of the same material, but of smaller cross-section which have been metallised.

U.S. Pat. No. 3,069,644 is directed to a bolometer comprising an evacuated envelope having a glass frame, a thin film of insulating material with spaced strips of metallic film on the insulating film, and a thin elongated layer of semiconducting material extending across the strip.

A semiconductor film bolometer infrared detector has been described in a paper by K. C. Liddiard titled "Thin Film Resistance Bolometer IR Detectors-II", published in Infrared Physics, Vol. 26, No. 1, p. 43, January 1986. This paper, and other reference cited above do not describe either the method of preparation or the materials technology which are features of the present invention. In particular, the method of preparation whereby a thin film bolometer infrared detector array is prepared by on-the-plane, single-sided monolithic microcircuit processing techniques, has not been previously described.

SUMMARY OF THE INVENTION

According to this invention a single detector, or a two-dimensional planar array of detectors, may be prepared by monolithic microcircuit processing techniques on a monocrystalline silicon substrate, and integrated with associated microelectronic signal conditioning and multiplexing circuits fabricated on the same substrate. When employed with a suitable optical system, the detector or detector array detects infrared heat radiation emitted from bodies within the field of view of the optical system.

An individual infrared detector is comprised essentially of a detector element formed on a thin dielectric pellicle, which is supported over a cavity in the monocrystalline silicon substrate. The detector element is a thin film of semiconductor material, together with thin film metallic contacts which form the electrical connection between the semiconductor material and a nearby electronic amplifier. The metallic films also serve to form, in conjunction with the semiconductor layer, the infrared absorbing mechanism of the detector. The cavity beneath the detector pellicle is produced by chemically etching through holes or slots created in the surface of the substrate.

Each detector element is connected to a low noise electronic amplifier, which may be a separate component, but in the preferred embodiment is located adjacent to the detector element on the same substrate. In the case of a large number of detectors in a two-dimensional array, additional electronic circuits which may include a bandpass filter, sample-and-hold, and multiplexor, are also fabricated by microelectronic processing techniques on the same substrate. This arrangement has considerable advantages in simplicity and device yield over hybrid designs where the detector array and signal processing electronics are fabricated on separated substrates.

BRIEF DESCRIPTION OF THE DRAWINGS

In order to fully understand the construction and method of preparation of the invention, reference should now be made to the accompanying drawings.

In these drawings.

DETAILED DESCRIPTION OF THE PREFERRED EMBODIMENT

Figure 1:
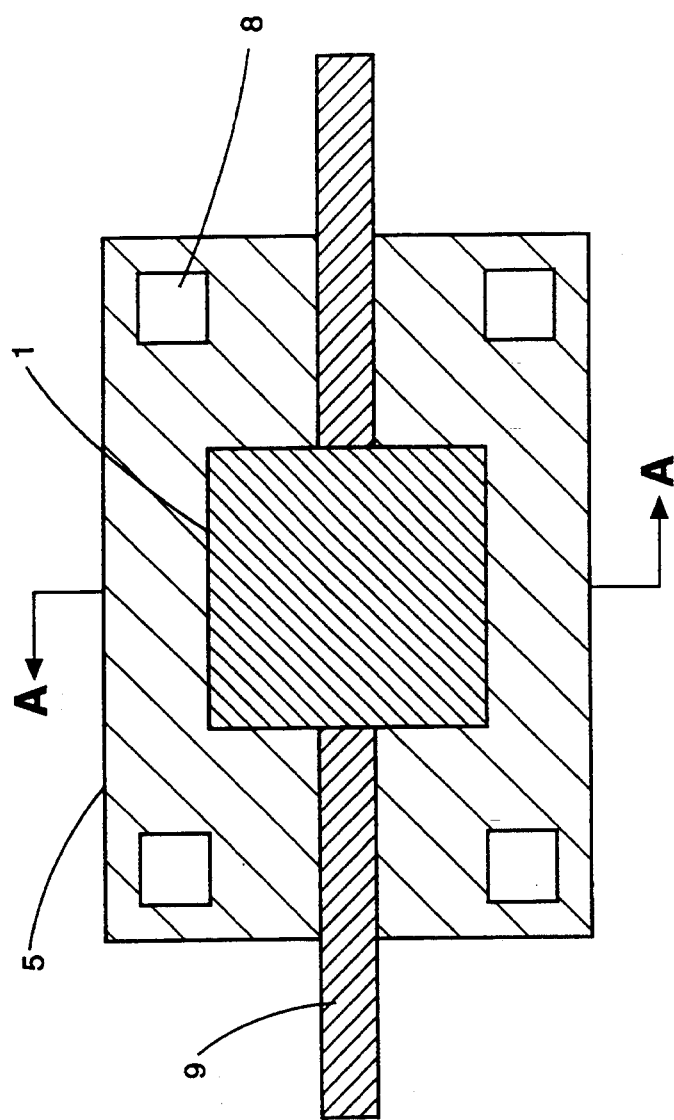
FIG. 1 is a schematic plan of a single detector element according to the invention.
Figure 2:
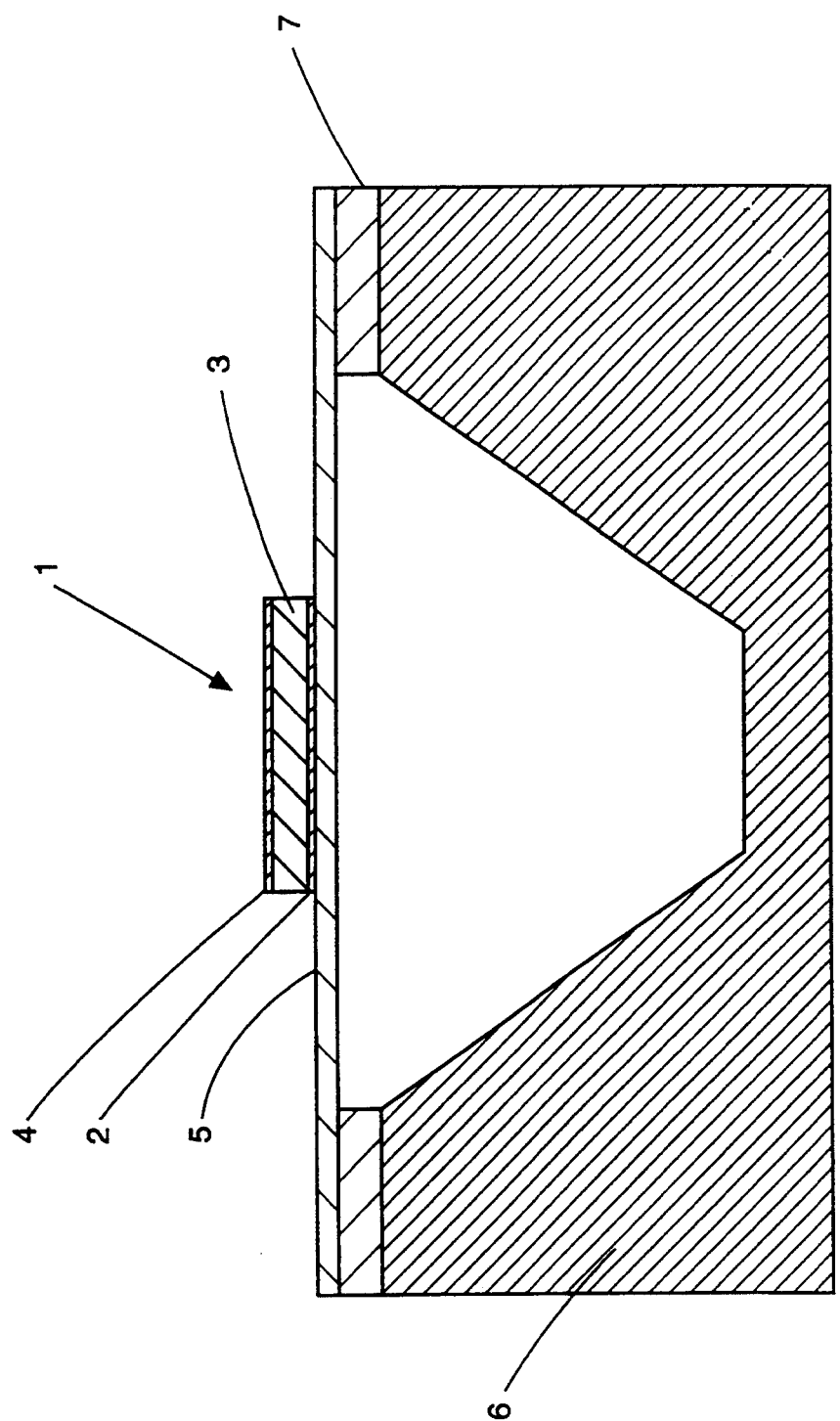
FIG. 2 is a side elevation of the invention.

The substrate is a monocrystalline silicon wafer (or slice) having a (1-0-0) surface orientation, of the type employed for the manufacture of monolithic microcircuit devices. Referring now to FIGS. 1 and 2, the detector element is designated 1, comprising bottom electrical contact 2, semiconductor layer 3, and top electrical contact 4. The pellicle is designated 5, silicon wafer substrate 6, and silicon dioxide insulator layer 7. Etch holes are numbered 8 and the electrical connection joining the detector element to a nearby electronic amplifier is shown as 9.

The detector is prepared as follows:

The substrate is first thermally oxidised, according to established practice, and windows are patterned in the silicon dioxide layer so formed by conventional photolithographic techniques using a hydrofluoric acid etchant. These windows, which extend to the surface of the silicon wafer, define the area where the pellicle is to be formed.

A suitable material is then deposited, which will later be removed but for the present fills the windows in the silicon dioxide. This material, which are referred to herein as the under-etch layer, is shown as component 10 in FIG. 3. The under-etch layer may be polycrystalline or amorphous silicon, deposited by chemical vapour deposition, sputter deposition, or thermal evaporation. In an alternative embodiment, the under-etch layer may be an amorphous dielectric material such as a glass or silicon dioxide deposited by chemical vapour deposition. Layers of this latter type are widely employed in microcircuit fabrication processes. The main requirement is that the under-etch layer can be removed by an appropriate etchant at a significantly faster etch rate than the window and pellicle materials.

The thickness of the under-etch layers is approximately the same as the window depth, such that the surface of the layer is coplaner with the upper surface of the oxidised wafer. Conventional lithographic techniques are again used to pattern the under-etch layer and produce the desired geometry. In the alternative embodiment, the under-etch layer may be deposited and planarised as a component layer of the particular microcircuit process used for preparation of the associated electronic circuit.

A thin dielectric film is then deposited over the entire wafer. This film, shown as the pellicle (5)in FIGS. 1, 2 and 3, must be a material having a low thermal conductivity, in order to minimise lateral heat loss from the detector element. It is also desirable that the deposition parameters be selected to produce a film with low mechanical stress, so as to avoid fracture after removal of the under-etch layer. The preferred pellicle materials are silicon nitride or silicon oxynitride prepared by chemical vapour deposition. An aluminium oxide film deposited by thermal evaporation, or a polyimide film prepared by established microelectronic processing methods, have also been found to be suitable options for pellicle fabrication. The thickness of the pellicle film will normally be in the range 50 to 250 nanometer, but polyimide films may be thicker due to the very low thermal conductivity typical of this material.

The first, or lower, contact film is then prepared as follows:

A thin metal film is deposited by sputter deposition or thermal evaporation onto the pellicle layer. This film will act as the bottom electrical contact for the heat sensitive semiconductor layer, and may also serve as the electrical conductor connecting the detector element to the external electronic circuit. The metal film is also an essential component of the infrared absorption mechanism of the detector design.

The desired geometrical shape of the metal film is produced by conventional photolithography using the lift-off technique, or alternatively sputter or plasma etching. The thickness of the film must be as small as possible, to minimise lateral heat loss. For the same reason, the width of the film where it forms the electrical interconnect conductor (shown as (9) in FIG. 1) must also be small.

In the preferred embodiment, the contact material is a thin film of platinum or a refractory/metal such as tantalum. It should be understood that thermal annealing carried out during detector processing may convert the metal to a silicide, depending on the annealing temperature. This will be caused by diffusion and reaction with the semiconductor layer which forms the heat sensitive element of the detector. Other metals which have been found to be suitable options, particularly for research purposes, include nickel or nickel-chromium alloy.

The next process step is deposition of the semiconductor heat sensitive layer. The preferred material is amorphous silicon prepared by low pressure chemical vapour deposition (LPCVD) or by plasma-enhanced chemical vapour deposition (PECVD), the latter also known as RF glow discharge deposition. These techniques produce amorphous silicon layers from chemical dissociation of silane gas, the resultant layer containing a varying proportion of hydrogen to give a material called hydrogenated amorphous silicon (a-Si:H). Sputter deposition from a silicon cathode in the presence of hydrogen produces a layer of similar characteristics, and this technique has been successfully employed as an optional method of preparation.

An alternative to an a-Si:H layer is a polycrystalline silicon layer prepared by thermal annealing of a LPCVD silicon deposit in a manner common to fabrication of VLSI microcircuit devices. This method may be preferred when the detector is prepared by high temperature processing in conjunction with an associated microelectronic circuit. By comparison, a-Si:H layers are produced at lower temperatures, and will normally be deposited after preparation of the microcircuit.

Depending on deposition conditions and detector geometry, the electrical resistivity of the semiconductor layer may be of the correct order of magnitude for satisfactory detector performance. It may, however, be desirable to introduce a suitable dopant material such as boron or phosphorus by addition of a small partial pressure of the desired gas, e.g. diborane or phosphine, during deposition. Alternatively, the dopant may be introduced by ion implantation. In this manner it is possible to achieve the specified electrical resistivity, hence resistance, of the detector element. The method chosen usually involves a compromise between the desired electrical resistivity and temperature coefficient of resistance (TCR).

The thickness of the semiconductor layer is chosen to give optimum infrared absorption, as described later in this specification. The layer is patterned by conventional photolithography using a chemical etchant, or by sputter, plasma or reactive ion etching.

Figure 4:
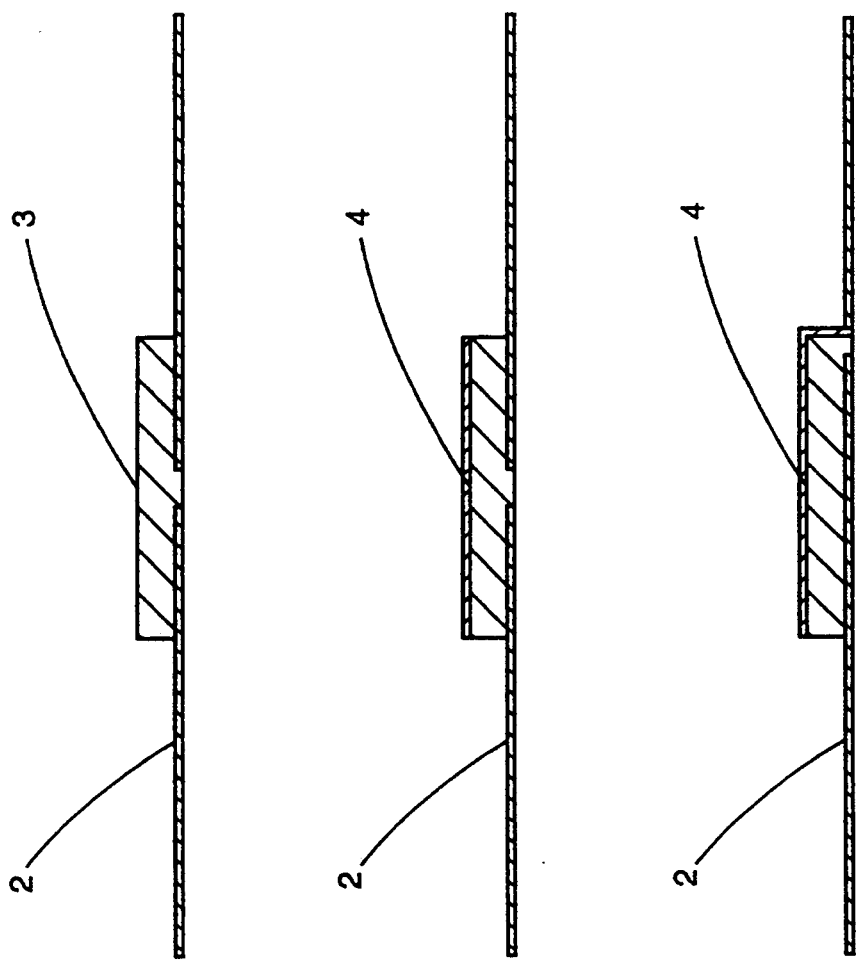
FIG. 4 illustrates optional methods of forming electrical contacts.
Figure 5:
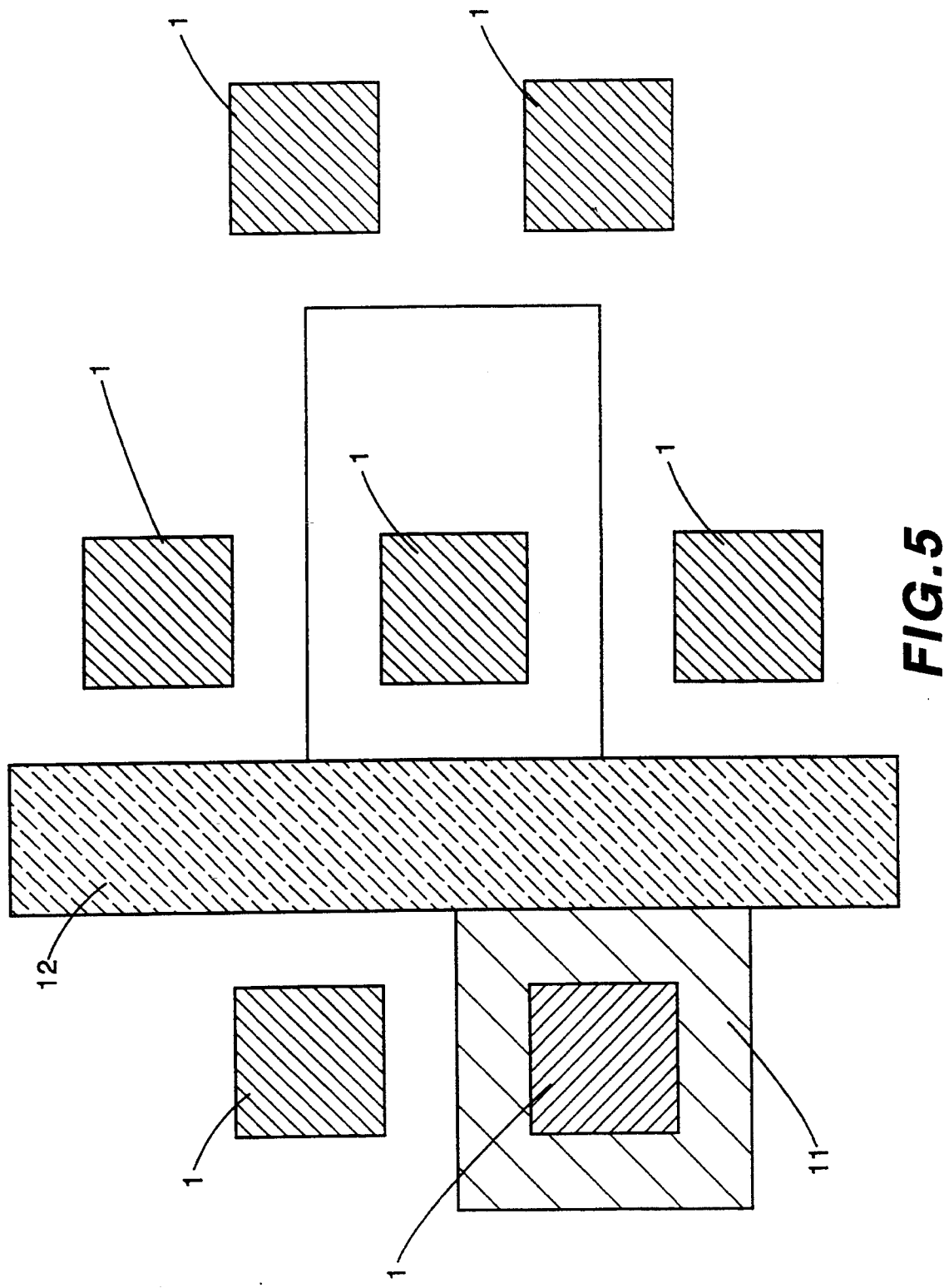
FIG. 5 shows how an array of detectors may be prepared together with an associated microelectronic circuit on the same substrate.

Reference should now be made to FIG. 4, where three alternative contact configurations are shown. The simple gap configuration has been previously described, see K. C. Liddiard, Infrared Physics, Vol. 26, No. 1, p. 43, January 1986, but may be considered as an alternative embodiment of the present invention when taken in conjunction with the method of preparation described herein. The preferred configurations, however, involve deposition of a second, or top contact film, as illustrated in FIGS. 2 and 4.

The top contact film will usually, but not necessarily, be of the same composition as the bottom contact film, and will have a thickness chosen to optimise infrared absorption. The film will again be patterned by the lift-off technique, or by sputter of plasma etching.

Research has shown that the electrical characteristics of the detector contacts can be advantageously modified by shallow doping of the semiconductor, which assists in the achievement of low contact resistance. An ohmic contact can also be obtained with a thin film of pure amorphous silicon between the metal and semiconductor layer.

Infrared absorption may be achieved by one of two optional techniques. For the simple gap contact configuration shown in FIG. 4, the single (bottom) contact layer will be deposited so as to have a nominal sheet resistance of 189 ohms per square, giving a maximum absorption of 50%. This result is a well known prediction of electromagnetic theory. It can be readily shown that the thickness of the semiconductor heat sensitive layer is not critical in-so-far as infrared absorption is concerned, but should be as small as possible to reduce planar thermal loss.

The use of a second (top) contact, as described above, enables an enhanced absorption to be achieved by virtue of the formation of an optical interference filter. The theory of this filter has been given by P. A. Silberg, in a paper titled "Infrared Absorption of Three-Layer Films", J. Opt. Soc. Amer., Vol. 47, No. 7 p 575, 1957; and the application to pyroelectric infrared detectors has been described in the article titled "Thin Film Absorber Structures for Advanced Thermal Detectors", J. Vac. Sci. Technol. A, Vol. 6(3), p 1686, May/June 1988.

There is, however, no known reference to the application of this technique to monolithic thin film bolometer infrared detectors. In this case, the bottom thin film metallic contact should be a perfect reflector at infrared wavelengths, whilst the top contact should have a nominal sheet resistance of 377 ohms per square. The thickness of the semiconductor heat sensitive layer must now be equal to $\lambda/4n$, where $\lambda$ is the wavelength of maximum absorption and $n$ is the refractive index of the semiconductor layer. The thickness will usually be chosen to attain maximum infrared absorption at 10 $\mu$m wavelength.

In practice it is found that the resistance of the metallic contact films are not critical—an absorption of at least 90% is achieved for the 8 to 12 $\mu$m waveband when the resistance of the bottom contact is less than 10 ohms per square, and that of the top contact is 300 to 500 ohms per square.

The final process step is thermal isolation of the detector element. During this step the detector element must be protected by depositing a layer of a suitable metal or dielectric material, which acts as an etch barrier. This layer may be aluminium, gold, silicon dioxide, silicon nitride or silicon oxynitride. Holes or slots are then patterned by chemical, sputter, plasma or reactive ion etching (or a combination of these), extending from the surface to the under-etch layer. At this stage it is also desirable to partially dice the substrate using a microcircuit dicing saw, to permit easy separation of individual detector arrays after thermal isolation.

If an under-etch layer other than silicon is employed then this layer must now be removed by etching through the holes or slots using the appropriate chemical etchant. If the under-etch layer is comprised only of silicon then this step may be omitted.

The substrate is then loaded in a glass or polytetrafluoroethylene holder and placed in a flask fitted with a reflux condenser. The flask contains an anisotropic silicon etchant, maintained at the required temperature by immersion in a temperature-controlled glycerol or oil bath. High purity nitrogen is circulated through the flask and the etchant is subjected to gentle agitation using magnetic stirring. The preferred etchant is ethylene diamine pyrocatechol (EDP). Hydrazine or potassium hydroxide may also be used. The choice of etchant may also dictate appropriate selection of the protective layer material.

Figure 3:
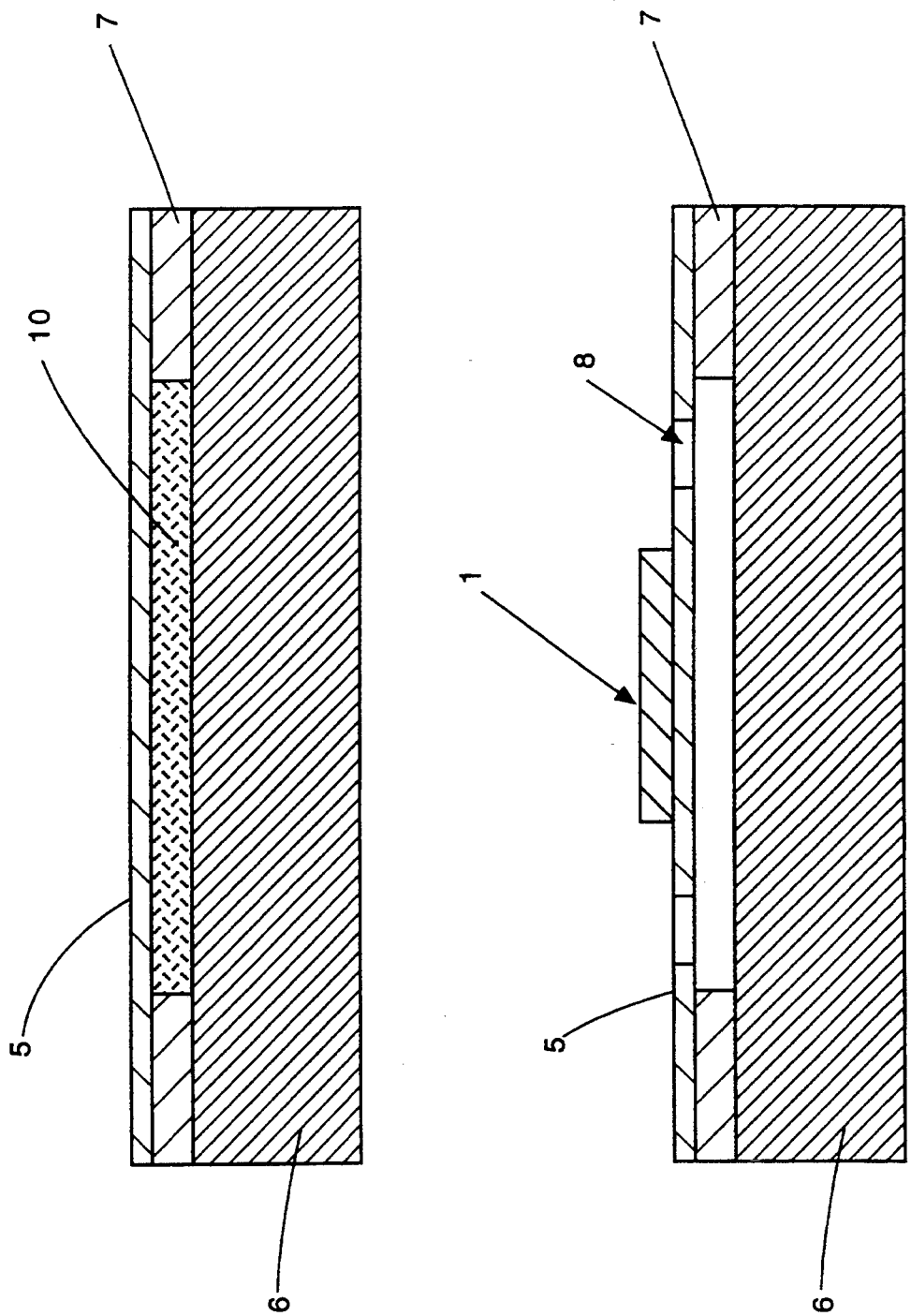
FIG. 3 shows the method of thermal isolation.

During this process step (or these process steps) the under-etch layer is rapidly etched and removed through the etch holes to expose the underlying monocrystalline silicon substrate. The progress at this point is illustrated in FIG. 3 (the protective layer is not shown for reasons of simplicity). The silicon substrate is then etched to form a pyramidal-shaped cavity beneath the detector element, conforming precisely to planes of crystal symmetry.

Following removal of residual etchant, thence rinsing and drying, the protective layer is removed and the detector elements are now seen to be supported on pellicles over the cavities formed in the substrate. It is noted that a protective layer such as silicon nitride may be retained to add strength to the pellicle, but this layer will contribute additional thermal capacitance and heat loss.

Individual detector arrays may now be separated from the substrate. In this regard, it should be understood that a number of arrays will normally be prepared on a single substrate by means of step-and-repeat artwork generated on photolithographic mask sets.

Alternative methods of thermal isolation involving anisotropic etching through the rear surface of the substrate have been described in references cited in this specification. However, the present invention is concerned solely with monolithic single-sided wafer processing. A demonstrated option to the above procedure is to complete the cavity etch prior to deposition of the under-etch layer, all other processing steps remaining the same.

As noted earlier, the detector array may be integrated with a microelectronic circuit formed on the same silicon wafer substrate. This circuit will typically comprise voltage bias, signal amplification, sample-and-hold, and multiplexing components, prepared by VLSI microcircuit fabrication techniques. The choice of detector materials will determine the sequence of operations in a fully integrated process schedule. Thus polysilicon and refractory silicide metallisation can withstand the high temperatures of VLSI processing, whilst amorphous silicon and platinum-based metallisations must be deposited after completion of microcircuit preparation.

Following processing, individual array chips are mounted and wire bonded in a suitable microcircuit package. An infrared window comprised of one of the materials germanium, silicon, zinc sulphide or zinc selenide, is sealed to the package. Each side of the window is coated with an anti-reflection coating optimised for infrared transmission in the 8 to 12 $\mu$m waveband. The package is sealed in an atmosphere of nitrogen gas or, preferably, a gas having a low thermal conductivity such as xenon. A novel vacuum packaging technology has been developed, which comprises a desirable but not essential feature of the present invention. It may be noted that sealing in a vacuum or a low thermal conductivity gas reduces heat loss from the detector element, with a subsequent increase in detector response.

I claim:

1. A thermal infrared detector, comprising:

a heat-sensitive semiconductor layer and a plurality of thin film metallic contacts therefor, deposited onto a dielectric pellicle of low thermal conductivity material suspended over a cavity of a supporting substrate for said pellicle.

2. The thermal infrared detector of claim 1, wherein:
said pellicle is supported on a surface of said substrate;
said substrate is a monocrystalline silicon wafer; and
said cavity is an anisotropically etched cavity opening through said surface.

3. The thermal infrared detector of claim 1, wherein:
said heat-sensitive semiconductor layer is a sputter-deposited layer of semiconductivity silicon.

4. The thermal infrared detector of claim 1, wherein:
said heat-sensitive semiconductor layer is a chemical vapour-deposited layer of semiconducting silicon.

5. The thermal infrared detector of claim 1, wherein:
said thin film metallic contacts are each made of at least one thin layer of a metallic material selected from the group consisting of nickel, nickel-chromium, platinum, platinum silicide, tantalum and tantalum silicide.

6. The thermal infrared detector of claim 1, wherein:
said pellicle is made of an inorganic dielectric material selected from the group consisting of aluminum oxide, silicon nitride, and silicon oxynitride.

7. The thermal infrared detector of claim 1, wherein:
said pellicle is a layer of polyamide.

8. The thermal infrared detector of claim 1, further including:
a signal amplifier, a voltage bias, a sample and hold circuit, and a multiplexing electronic circuit, all operatively associated with one another and with said detector and supported on said substrate.

9. A two-dimensional array of thermal infrared detectors, each comprising:
a heat-sensitive semiconductor layer and a plurality of thin film metallic contacts therefor, deposited onto a dielectric pellicle of low thermal conductivity material suspended over a cavity of a supporting substrate for said pellicle;
said substrate for each said detector being a corresponding portion of an integral wafer of substrate material.

10. The two-dimensional array of thermal infrared detectors of claim 9, wherein:
each said pellicle is supported on a surface of said wafer;
said wafer is a monocrystalline silicon wafer; and
each said cavity is an anisotropically etched cavity opening through said surface.

11. The two-dimensional array of thermal infrared detectors of claim 9, wherein:
each said heat-sensitive semiconductor layer is a sputter-deposited layer of semiconductivity silicon.

12. The two-dimensional array of thermal infrared detectors of claim 9, wherein:
each said heat-sensitive semiconductor layer is a chemical vapour-deposited layer of semiconducting silicon.

13. The two-dimensional array of thermal infrared detectors of claim 9, wherein:
each said thin film metallic contacts are each made of at least one thin layer of a metallic material selected from the group consisting of nickel, nickel-chromium, platinum, platinum silicide, tantalum and tantalum silicide.

14. The two-dimensional array of thermal infrared detectors of claim 9, wherein:
each said pellicle is made of an inorganic dielectric material selected from the group consisting of aluminum oxide, silicon nitride, and silicon oxynitride.

15. The two-dimensional array of thermal infrared detectors of claim 9, wherein:
each said pellicle is a layer of polyamide.

16. The two-dimensional array of thermal infrared detectors of claim 9, wherein each said detector further includes:
a signal amplifier, a voltage bias, a sample and hold circuit, and a multiplexing electronic circuit, all operatively associated with one another and with the respective said detector and supported on the respective corresponding portion of said integral wafer of substrate material.

* * * * *